United States Patent [19]
Ueno et al.

[11] Patent Number: 5,918,001
[45] Date of Patent: Jun. 29, 1999

[54] DISK DRIVE APPARATUS AND ERROR RECOVERY METHOD IN THE DISK DRIVE

[75] Inventors: Shinji Ueno; Yasuhiro Iihara, both of Fujisawa; Haruo Andoh, Zama; Takashi Nakamura, Fujisawa, all of Japan

[73] Assignee: International Business Machines Corporation, Armonk, N.Y.

[21] Appl. No.: 08/802,019

[22] Filed: Feb. 18, 1997

[30] Foreign Application Priority Data

Feb. 16, 1996 [JP] Japan .................................. 8-029055

[51] Int. Cl.⁶ ........................... G06F 11/00; G11B 20/12
[52] U.S. Cl. ....................... 395/182.06; 371/10.2
[58] Field of Search ................... 395/182.03, 182.04, 395/182.05, 182.06, 185.07; 371/10.2, 10.3, 21.6

[56] References Cited

U.S. PATENT DOCUMENTS

| | | |
|---|---|---|
| 4,800,563 | 1/1989 | Itagaki et al. ........................ 371/10.2 |
| 4,914,656 | 4/1990 | Dunphy, Jr. et al. ................. 371/10.2 |
| 5,271,018 | 12/1993 | Chan ................................... 371/10.2 |
| 5,379,162 | 1/1995 | Cunningham et al. ............... 371/40.14 |
| 5,530,673 | 6/1996 | Tobita et al. .......................... 371/21.1 |
| 5,539,899 | 7/1996 | Huynh et al. ....................... 395/497.02 |
| 5,666,512 | 9/1997 | Nelson et al. ...................... 395/182.04 |
| 5,742,792 | 4/1998 | Yanai et al. ........................... 371/21.1 |

*Primary Examiner*—Joseph E. Palys
*Attorney, Agent, or Firm*—Ingrid M. Foerster; G. Marlin Knight

[57] ABSTRACT

A disk drive has an error recovery procedure with a plurality of ERP steps. An unused capacity of an alternate area on a disk for reassigning data is determined. While executing the error recovery procedure, an execution condition for reassigning data is changed based unused capacity of the alternate area. Data is reassigned to the alternate area in response to the execution condition. This prevents the early loss of the alternate area.

16 Claims, 3 Drawing Sheets

[Document type] Drawing

[Figure 1]

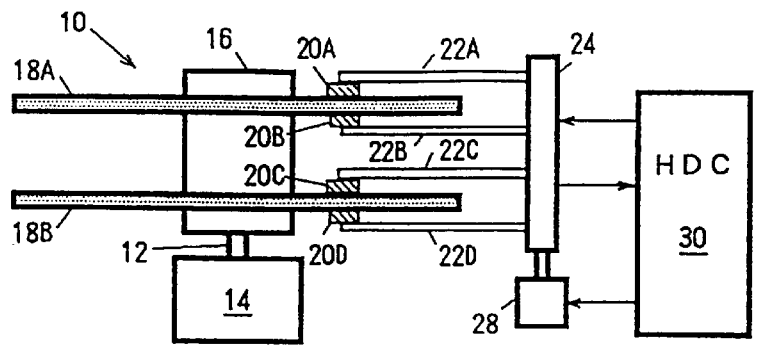

[Figure 3]

| ERP steps | ERP routines | Address | Attribution |
|---|---|---|---|
| 1 | No servo calculation | 107000h | 0000h |
| 2 | Offline correction | 107100h | 0001h |
| 3 | PLL center frequency adjustment | 107200h | 0002h |
| ⋮ | Erasure correction | 107300h | 0003h |
| ⋮ | 2nd SYNC | 107400h | 0004h |
| ⋮ | Low spin burnish | 107500h | 0006h |
| ⋮ | Dummy sector pulse | 107600h | 0007h |
| | PLL gain adjustment | 107700h | 0005h |
| 158 | Rereading | 107800h | 0001h |

[Figure 4]

| ADR levels | Number of reassignable sectors (N) |
|---|---|
| 1 | $175 < N \leq 200$ |
| 2 | $150 < N \leq 175$ |
| 3 | $125 < N \leq 150$ |
| 4 | $100 < N \leq 125$ |
| 5 | $75 < N \leq 100$ |
| 6 | $50 < N \leq 75$ |
| 7 | $N \leq 50$ |

[Figure 2]
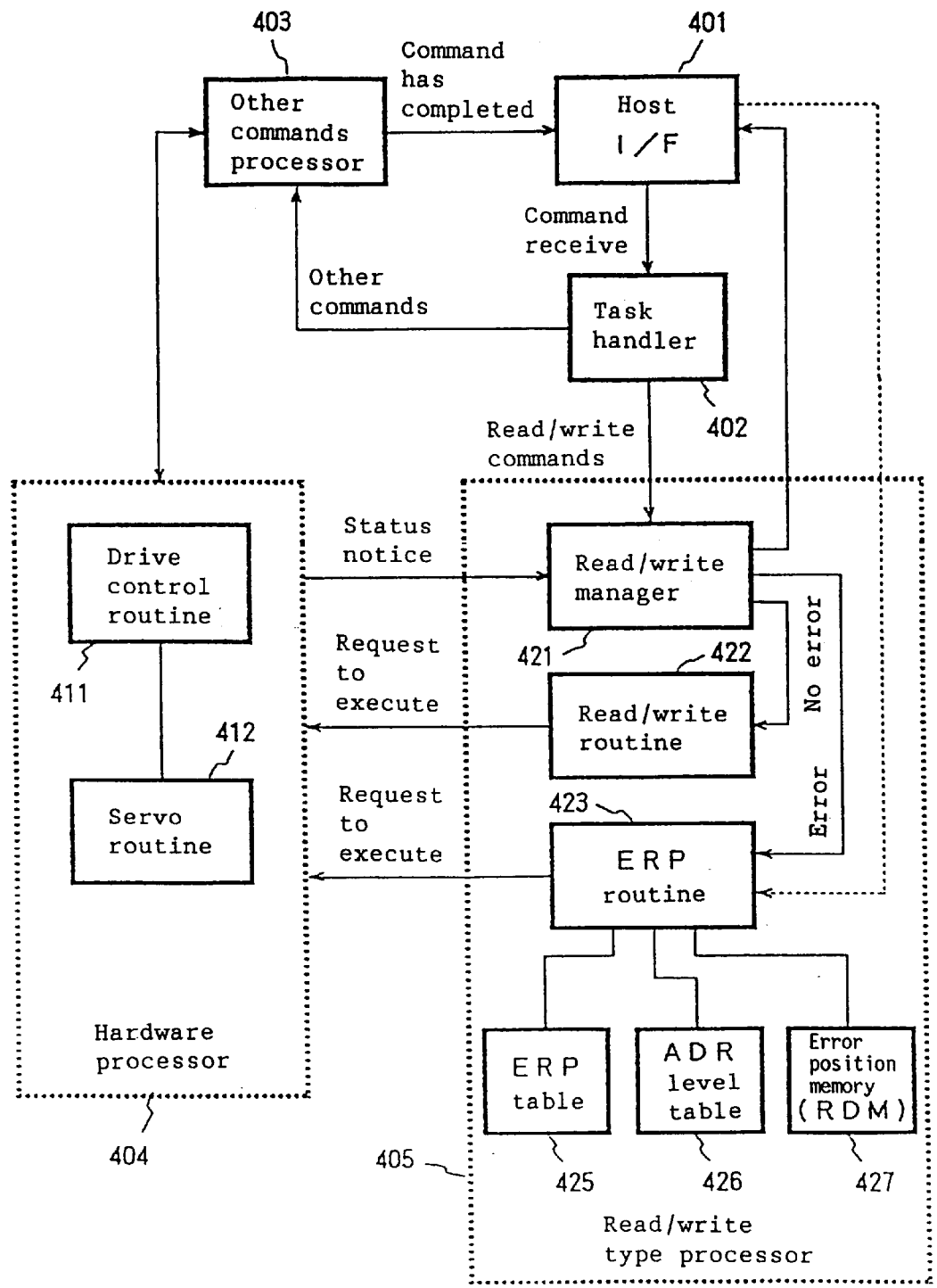

[Figure 5]
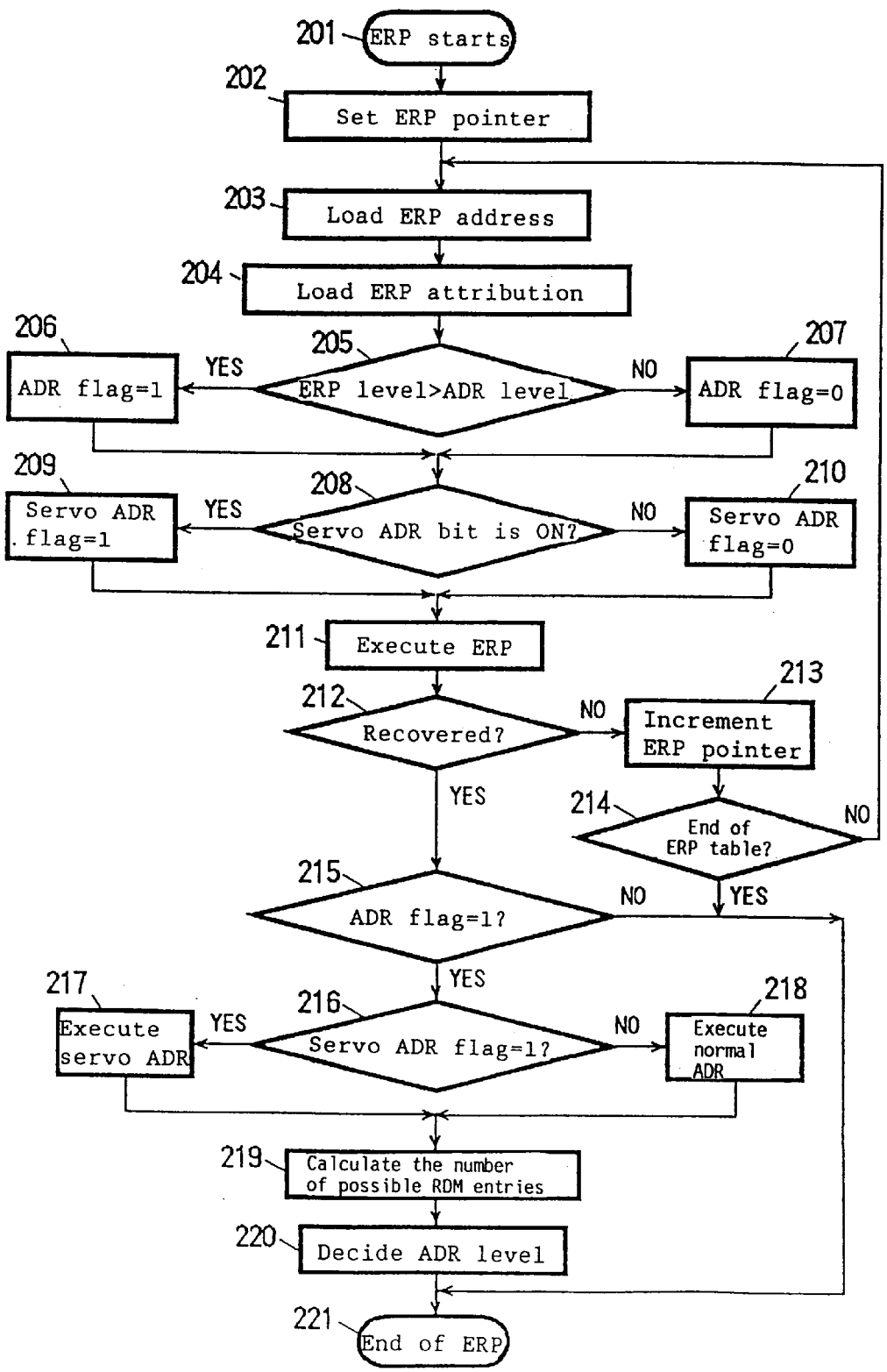

DISK DRIVE APPARATUS AND ERROR RECOVERY METHOD IN THE DISK DRIVE

FIELD OF THE INVENTION

The present invention relates to error recovery in a disk drive, and in particular to a method and apparatus for reassigning data when an error occurs.

BACKGROUND ART

A magnetic disk drive is a device for storing data. In a magnetic disk drive, data is written to and read from a magnetic disk surface. To read or write data, a head, i.e., a signal transducer, is positioned at a desired track. Two types of operations are conventionally provided in a disk drive to deal with errors occurring during reading and writing: an error recovery procedure, and a data reassign operation. An error recovery procedure (ERP) is conventionally known as an operation for recovering from an error which occurred while reading or writing data. The data reassign operation moves data from a part of the disk determined to be defective to a predetermined alternate area on the disk.

An error can occur in the disk drive due to a flaw in or unevenness of the magnetic material which occurs in the manufacturing process. Errors can also occur due to the change of the magnetic material over time. If an error occurs in the data stored on the disk, various error recovery processes may be executed. The error recovery processes include error recovery by ECC, changing the read gain, changing the offtrack value, and changing the bias value of the Magneto-Resistive (MR) element for reading. After executing the error recovery processes, a read operation is executed again. If the error persists even after executing a plurality of error recovery processes, then the error is an unrecoverable data error or a "hard error". Data from a defective area of the disk may be reassigned to a new location as part of the error recovery process. Data is reassigned by rewriting the data that is recorded in the area of the disk in which the error occurred to another predetermined area on the disk, even if the error recovery process was successful.

Recently, MR heads have become widely used in disk drives. An MR head has an MR element and the output resistance of the MR element changes with the changes in the magnetic field. To read data, the change in resistance is converted to a d.c. voltage by supplying a predetermined current through the MR element.

However, it was found that a new type of error can occur in disk drives using MR heads. This error is due to thermal asperity. A thermal asperity is a protrusion which appears on the surface of the disk. The protrusion collides with the MR head, causes the resistance of the MR element to change due to a temperature change in the MR element, and thereby generates an abnormal signal.

As a countermeasure against the error from thermal asperity, one method reduces the rotational speed of the disk to decrease the flying height of the magnetic head. By reducing the flying height of the head, the protrusion on the disk can be cut and the cause of the thermal asperity can be removed. This countermeasure is called low spin burnish and is also incorporated as one of the steps in an error recovery procedure (ERP).

As described above, various recovery means can be used to recover from errors which occur while reading or writing data. The recovery means are usually stored as a series of continuous steps in the ERP and are executed sequentially by a command from the system.

If an error occurs while reading or writing data, the hard disk drive (HDD) executes the ERP. Error recovery is attempted by executing one or more error recovery steps in the ERP, e.g., changing some standard reading conditions. For example, the reading conditions may include: an offtrack amount, i.e., the amount of deviation between the center of the track and the center of the magnetic head; a value of the bias current provided to the MR element if the magnetic head has an MR element; and parameters of the PLL circuit to stabilize the sampling frequency.

The individual steps in the ERP are executed sequentially, and a retry, i.e. an attempt to reread the data, is carried out at the end of each step. If the retry succeeds, the ERP ends. If the retry fails, the ERP terminates when a preset maximum number of retries is reached or when the last step of the ERP is completed.

Along with the series of error recovery steps, another countermeasure performs a data reassign operation. The data reassign operation writes the data stored in the sector-in-error to another position on the disk, i.e., an alternate or "spare" area. Subsequently, the sector-in-error is no longer used because the probability that similar errors will successively re-occur in the sector-in-error is high, and will thereby cause an unrecoverable hard error. The alternate area was previously reserved on the disk with a predetermined capacity. If an error is recognized as an unrecoverable error, the data stored in the sector-in-error is rewritten to the alternate area of the disk.

In a conventional disk drive system, a data reassign operation is executed under the following conditions, for example:

a) when a hard error is identified while writing data;

b) when an error occurred while reading data, and the error recovery is followed by a particular predetermined error recovery step; and c) when a hard error is identified while reading data, data is then written to the same sector where the error occurred, and a similar error reappears as a result of verifying the written data.

In a conventional disk drive system, if any of the above conditions are met, the data reassign operation is performed automatically to move and write the data stored in the sector-in-error to an alternate area of the disk.

However, because the capacity of the alternate area is limited, the amount of data which can be reassigned is limited. If the data reassign operation is performed frequently, the alternate area will quickly become full. Therefore, for subsequent errors, using the data reassign operation for error recovery becomes impossible. Alternatively, if the conditions for executing the data reassign operation are restricted, the frequency of errors becomes high and the amount of time required to execute the ERP to recover from errors increases. Therefore, system performance degrades. Errors from thermal asperity are unique to MR heads and may occur after the disk drive has been used for a certain period of time. Therefore, there is a need to reserve capacity in the alternate area on the disk to handle future errors.

SUMMARY OF THE INVENTION

An object of the present invention is to assure the efficient execution of the data reassign operation in a disk drive.

The present invention provides a method and apparatus which dynamically changes the conditions for executing a data reassign operation to move data stored in a sector-inerror to an alternate spare area on the disk (reassign area). That is, the present invention changes the conditions for executing a data reassign operation according to the remainder of usable storage space in the alternate area.

A method for error recovery in a disk drive has an error recovery procedure with a plurality of ERP steps. The method determines an unused capacity of an alternate area on a disk for reassigning data. While executing the error recovery procedure, an execution condition for reassigning data is changed based on the unused capacity of the alternate area. Data is reassigned to the alternate area only if the execution condition is met.

An apparatus for error recovery in a disk drive comprises an error recovery procedure execution means, a condition change means and a data reassign means. The error recovery procedure execution means executes a plurality of ERP steps and also has an unused capacity determination means for determining an unused capacity of an alternate area on a disk. The alternate area has a predefined total measurable capacity. The condition change means changes an execution condition based on the unused capacity of the alternate area. The data reassign means is responsive to the execution condition and reassigns data to the alternate area.

In the present invention, the frequency of data reassign operations is reduced by loosely setting the reassign conditions if the remaining usable capacity of the alternate area is sufficient. That is, the data reassign operation is performed even for minor errors. However, if the remaining capacity of the alternate area is small, then the conditions for executing the data reassign operation are restricted. By dynamically changing the conditions for executing a data reassign operation, the limited capacity of the alternate area on the disk is effectively utilized.

The present invention executes an error recovery procedure if an error occurs while reading or writing data, checks the usable remaining capacity of the alternate area for data reassignment, and reassigns data to the alternate area according to conditions which are changed depending on the remaining capacity.

During the error recovery procedure for an error during reading if the error recovery sequence has been successful, the step for successful error recovery is identified. The types of error recovery steps for which the data reassign operation is performed are then limited, based on this information, in response to the reduced capacity of the alternate area.

BRIEF DESCRIPTION OF THE DRAWINGS

FIG. 1 is a block diagram of an exemplary disk drive suitable for practicing the present invention;

FIG. 2 is a block diagram of an error recovery system for use in a disk drive according to the preferred embodiment of the present invention;

FIG. 3 is a table listing the ERP steps of an error recovery procedure according to the preferred embodiment of the present invention;

FIG. 4 is an automatic data reassign (ADR) table used in the error recovery procedure of the a preferred embodiment of the present invention showing the relationship between the ADR levels and the number of reassignable sectors; and FIG. 5 is a flowchart of the error recovery procedure and data reassign operation of the preferred embodiment of the present invention.

DETAILED DESCRIPTION OF THE PREFERRED EMBODIMENTS

FIG. 1 is an exemplary hard disk drive suitable for practicing the present invention. A disk drive 10 comprises a disk portion and a hard disk controller (HDC) 30 having a local CPU. The disk portion includes a mechanism 14 to rotate a spindle 12, e.g., a spindle motor, at high speed. A cylindrical support 16 is attached to the spindle 12 so that the centers of the respective axes of the spindle 12 and support 16 coincide. One or more disks 18A, 18B store information and are mounted on the outer peripheral surface of the cylindrical support 16 separated by a predetermined distance. When the spindle motor 14 rotates the spindle 12, the disks 18A and 18B rotate integrally with the cylindrical support 16.

The heads 20A, 20B, 20C, and 20D are positioned and supported by access arms 22A, 22B, 22C, and 22D to oppose the disk surfaces, respectively. The access arms 22A to 22D are attached to an actuator motor 28 through a shaft 24. When the actuator motor 28 rotates the shaft 24, the heads 20A to 20D are positioned at a desired location with respect to the disks 18A, 18B. The spindle motor 14 and the actuator motor 28 connect to the HDC 30, which controls the rotational speed and positioning of the heads. The HDC 30 can connect to a host.

In general, data tracks are formed concentrically on the magnetic disk, such as a hard disk. Data are read from or written to the disk after performing a seek operation. A seek operation positions the head at a specific data track by moving the head substantially radially with respect to the disk. Information identifying a specific data track, i.e., an address, has been previously recorded on the disk. The head is positioned to a specific data track by reading the address identifying the head position from the disk.

After positioning the head at a desired track, an operation to read or write data is executed. At this point, an error, i.e., a failure to accurately read or write data, can occur. Errors in the data are often caused by missing information, i.e., drop-outs. The drop-outs are often caused by changes in or damage to the magnetic material of the disk over time. Usually, data is read under standard reading conditions set in the disk, head, and HDC. That is, data is read with parameters such as the offtrack amount, and the bias current of the MR element and set to standard values as described above.

If an error occurs while reading data under the standard reading conditions, the data is reread. Rereading is performed after intentionally degrading the trackability or maintaining the amplification factor of the automatic gain control (AGC) for signal amplification. These conditions are changed by initiating the ERP, which sequentially executes a plurality of error recovery steps.

The present invention dynamically changes the execution conditions for performing data reassign operations in connection with the error recovery process described above. Therefore the present invention achieves efficient use of the alternate area.

FIG. 2 shows a block diagram of an error recovery procedure suitable for practicing the present invention. A host interface (I/F) 401 handles communication with a host system. The host I/F 401 receives a command from the host system, and communicates the command to a task handler 402. The task handler 402 divides the commands into types, i.e. read/write and other types of commands. The task handler 402 sends the read/write commands to a read/write command processor 405, and sends the other types of commands to a second command processor 403.

The hardware processor 404 is a mechanism for operating the disk drive hardware. It includes a drive control routine 411 for controlling the HDC, the read/write channel, for example, and a servo routine 412 for controlling the servo system.

The following operations are required to read data from or write data to the HDD:

a. Interpreting the command to identify the desired physical location of the data to be read or written;

b. Positioning the head at the desired physical location on the disk (seek);

c. Executing an operation to read or write data; and d. If the track ends in the middle of the data, seeking to the next track and executing an operation to read or write the remaining data.

The read/write command processor 405 executes commands received from the task handler 402 while determining the corresponding status for each step, a to d above.

A read/write manager 421 within the command processor 405 is a routine which determines the present read/write status and decides which routine to execute next. A read/write routine 422 sends a request to the hardware processor 404 to execute an operation according to the next routine selected by the read/write manager 421. In response to the request, the hardware processor 404 executes the requested operation and communicates the result to the read/write manager 421 as a status notice. If the status notice indicates that the routine completed without error, the read write manager begins the next operation. If all the steps to process the command are completed, the result is communicated to the host via the host I/F 401.

However, if an error occurs in any of the steps to process the command, the read/write manager 421 causes an ERP routine 423 to begin execution. The read/write manager 421 notifies the ERP routine 423 of the location (physical position) of the error. The ERP selectively executes a predetermined error recovery process for that location using an ERP table 425. If the ERP routine 423 recovers from the error, control is returned to the read/write manager 421 for normal command processing. An automatic data reassign (ADR) level table 426 is used to determine whether the data reassign operation is executed. An error position memory 417 has a reassign defect map (RDM) which stores the location of the error and the reassigned location of the data, as well as a list of spare sectors in the alternate spare area.

FIG. 3 is a table of some exemplary ERP steps or subroutines in the error recovery procedure according to the preferred embodiment of the present invention. The address column represents the memory locations containing the steps of the various error recovery subroutines executed by the ERP. Each subroutine is associated with an attribute or type representing a set of conditions which must be met for executing the data reassign operation. The subroutines are executed sequentially in the ERP. Each time a subroutine completes, a retry, i.e. a rereading operation, is performed to determine if the error recovery succeeded. The ERP subroutines of FIG. 3 include: a "No servo calculation" subroutine, which omits the servo calculation to prevent the inclusion of noise during the servo calculation; the "offline correction" and "erasure correction" subroutines which correct bit errors in the data by means of a predetermined calculation; "PLL gain adjustment" and "PLL center frequency adjustment" subroutines which change adjustable parameters of the PLL circuit; a "2nd SYNC" subroutine which uses a second synchronizing signal for data synchronization (SYNC); a "Dummy sector pulse" subroutine which generates a dummy pulse if the sector pulse in the servo area is lost; and, a "Low spin burnish" subroutine which reduces the rotational speed of the spindle motor to decrease the flying height of the head, thereby performing a burnishing step to remove foreign objects on the disk. Generally, the ERP includes many other error recovery subroutines as well.

The attributes listed in the table of FIG. 3 are called ADR levels. Each level is defined in the table of FIG. 4 as a set of conditions which must be satisfied in order to execute a reassign operation for a subroutine having the specified level. More specifically, each level preferably corresponds to a minimum range of reassignable sectors that must be available in the alternate area to permit a reassign operation at the successful completion of a subroutine at that level. For example, it shall be assumed that the error recovery procedure subroutines are executing in sequence and that the error is cleared at the completion of ERP step 3 (PLL center frequency adjustment). ERP step 3 is defined as a level 2 subroutine. To determine whether or not to execute a reassign operation at this point, the ADR table of FIG. 4 is consulted. The minimum range of values corresponding to ADR level 2 is 150<N≦175. Thus a reassign operation will only be executed if the number of sectors remaining in the alternate data area is at least 150 sectors.

The attributes of the table in FIG. 3 provide information on whether a data reassign operation is executed on a sector by sector basis, or collectively for a plurality of sectors. For example, if an error occurs in the servo area, it will be assumed that the dummy sector pulse ERP subroutine will be executed. If this subroutine recovery step recovers from the error in the servo area, then the plurality of sectors following that servo area are collectively reassigned (servo ADR), provided the reassign execution conditions in the table of FIG. 4 have been met.

Referring to FIG. 4, there are seven (7) ADR levels, 1 to 7, shown. Each ADR level corresponds to a number of reassignable sectors as previously described. For example, ADR level 1 corresponds to the number N of reassignable sectors where 175<N≦200. ADR level 2 corresponds to the number N of reassignable sectors where 150<N≦175. The number of reassignable sectors remaining may be obtained from the number of unused spare sector entries remaining in the reassign defect map (RDM). This is because the RDM registers the address of each sector-in-error reassigned and its corresponding reassign location address. Since registration in the RDM is required to execute a data reassign operation, the number of reassignable sectors corresponds to the number of unused entries of the RDM. Alternatively, the number of sectors remaining can be determined by calculating the ratio of the unused capacity of the RDM to the total capacity of the RDM, for example.

FIG. 5 is a flowchart of the ERP and data reassign operations according to the preferred embodiment of the present invention. FIG. 5 shows a flowchart for executing the ERP subroutines and the data reassign operation using the tables of FIGS. 3 and 4. If an instruction to execute the ERP due to an error is received in step 201, then in step 202, a pointer is set to the first step to execute of the error recovery steps in the ERP table. The address of the error recovery step is loaded in step 203, and the corresponding attribute is loaded in step 204. In step 205, the ERP level identified from the loaded attribute and the current ADR level are compared. The current ADR level is determined according to the number of reassignable sectors using the ADR table of FIG. 4. If the ERP level is greater than the current ADR level, an ADR flag is set in step 206; otherwise, in step 207, the ADR flag is not set.

The comparison of the specific ERP and ADR levels will be described using FIGS. 3 and 4. For example, if the maximum number of reassignable sectors is 200 and 110 sectors of data are already reassigned, then the current number of reassignable sectors is 200−110=90. According to the table of FIG. 4, the ADR level for N=90 is 5. The ERP level is shown by the numerical value at the fourth digit of the value of the attributes in FIG. 3. For example, the ERP level is 1 for offline correction, and 6 for low spin burnish. Thus, if the loaded ERP attribute is for offline correction, then ERP level 1 is not greater than ADR level 5. Therefore, the result of the determination in step 205 is negative and the ADR flag is not set. In contrast, if the loaded attribute represents low spin burnish, then the ERP level 6 is greater than ADR level 5. Therefore, the result of the determination in step 205 is positive and the ADR flag is set. The setting of the ADR flag indicates that the predetermined conditions shown in FIG. 4 have been satisfied and reassignment will occur.

In step 208, it is determined from the value of the attribute whether a servo ADR bit is specified. If a servo ADR bit is set, then in step 209, the servo ADR flag is set. If the servo ADR bit is not set, then the servo ADR flag is not set in step 210. Among the error recovery steps shown in the table of FIG. 3, a servo ADR bit is set only for the "dummy sector pulse" ERP routine. In step 211, the ERP step is executed. The first ERP step to execute is the step pointed to by the ERP pointer of step 202. In step 212, the ERP checks whether the ERP step succeeded. If not, then the ERP pointer is incremented in step 213 and the next error recovery step to execute is entered. In step 214, if the executed error recovery step is the last step, the ERP ends at step 221. In step 212, if the ERP step succeeded, then the state of the ADR flag is checked in step 215. If the ADR flag is not set, the ERP ends at step 221 without executing a data reassign operation. If the ADR flag is set, it is determined in step 216 whether the servo ADR flag is set. If the servo ADR flag is set, the data reassign operation for a plurality of sectors following the servo area is executed in step 217; otherwise the normal data reassign operation on a sector basis is performed in step 218. After the end of either data reassign operation, the number of unused entries, i.e., reassignable sectors, in the reassign defect map (RDM) is calculated in step 219. In step 220, from the number of calculated reassignable sectors, a new ADR level is determined based on the ADR table of FIG. 4. After step 220 is executed, the ERP ends in step 221.

One of the important features of the present invention is that the ADR level is changed by the current number of reassignable sectors (steps 219 and 220). The ADR level, which is preferably always updated in this way, is compared with the ERP level of the ERP routine to be executed, and according to the comparison result, it is determined whether the data reassign operation is executed (steps 205, 206, 207). In accordance with the flowchart of the present invention, even if the execution of the same ERP routine results in a successful error recovery in the same step, a data reassign operation may not be executed. For example, even if the error recovery was successful by executing the "PLL center frequency adjustment" (ERP level=2) of FIG. 3, a data reassign operation is only performed if the number N of reassignable sectors at the time of error recovery is greater than 175 (ADR level=1); however, a data reassign operation is not performed if N is less than or equal to 175 (ADR level=2, 3 . . .). Therefore, according to the flowchart depicting the present invention, the data reassign operation execution conditions are more restricted as the capacity of the reassign area decreases. Consequently, the reassign area on the disk remains available for a longer period of time than it would absent the present invention.

Although the present invention has been described using an exemplary magnetic disk drive, the present invention is also applicable to disk drives using other recording methods, such as optical recording.

According to the disk drive and the error recovery method of the present invention, the limited capacity of the data reassign area is efficiently used for a long period of time, and the disk drive has high probability of error recovery.

We claim:

1. An apparatus for error recovery in a data storage device having a data storage medium and a head assembly for reading and writing information on said storage medium, comprising:

means for determining an unused capacity of an alternate area on the storage medium, the alternate area having a predefined total capacity;

means for changing an execution condition based on the unused capacity of the alternate area;

means for sequentially executing a plurality of error recovery steps in response to the occurrence of an error during reading or writing, wherein each error recovery step is associated with a set of execution conditions;

means for determining if a detected error has been corrected by one of the plurality of error recovery steps, means for identifying which of the plurality of error recovery steps corrected the error, and means for selectively causing the data reassign means to reassign data at successful completion of the identified step only if its associated set of execution conditions has been met; and a data reassign means, responsive to the execution condition, for reassigning data to the alternate area during error recovery only if the execution condition has been met.

2. The apparatus of claim 1, further comprising means for detecting an error occurring during reading or writing.

3. The apparatus of claim 1, wherein if one of the plurality of error recovery steps corrects the error, the data reassigns means only reassigns data at completion of the step if the set of execution conditions associates with that step has been met.

4. The apparatus of claim 1, wherein the unused capacity determination means determines the unused capacity of the alternate area using a reassign defect map comprising an original address and a destination address of reassigned data.

5. An apparatus for error recovery in a data storage device having a data storage medium and a head assembly for reading and writing information on said storage medium, comprising:

means for determining an unused capacity of an alternate area on the storage medium, the alternate area having a predefined total capacity;

means for changing an execution condition based on a ratio of the unused capacity of the alternate area to the total capacity of the alternate area; and a data reassign means, responsive to the execution condition, for reassigning data to the alternate area during error recovery only if the execution condition has been met.

6. A data storage device, comprising:

a data storage medium;

a head assembly for reading and writing information on said storage medium; and an apparatus for error recovery, comprising, means for sequentially executing a plurality of error recovery steps in response to an occurrence of an error during reading or writing, wherein each error recovery step is associated with a set of execution conditions, means for determining an unused capacity of an alternate area on the storage medium, the alternate area having a predefined total capacity, means for changing an execution condition based on the unused capacity of the alternate area, means for determining if a detected error has been corrected by one of the plurality of error recovery steps, means for identifying which of the plurality of error recovery steps corrected the error, means for selectively causing the data reassign means to reassign data at successful completion of the identified step only if its associated set of execution conditions has been met, a data reassign means, responsive to the execution condition, for reassigning data to the alternate area during error recovery only if the execution condition has been met; and means for selectively causing the data reassign means to reassign data at successful completion of the identified step only if its associated set of execution conditions has been met.

7. The data storage device of claim 6, further comprising means for detecting an error occurring during reading or writing.

8. The data storage device of claim 6, wherein if one of the plurality of error recovery steps corrects the error, the data reassigns means only reassigns data at completion of the step if the set of execution conditions associates with that step has been met.

9. The data storage device of claim 6, wherein the unused capacity determination means determines the unused capacity of the alternate area using a reassign defect map comprising an original address and a destination address of reassigned data.

10. The data storage device of claim 6, wherein the condition change means changes the execution condition based on a ratio of the unused capacity of the alternate area to the total capacity of the alternate area.

11. A method for error recovery in a data storage device having a data storage medium and a head assembly for reading and writing information on said storage medium, comprising the steps of:

determining an unused capacity of an alternate area on the storage medium, the alternate area having a predefined total capacity;

changing an execution condition based on a ratio of the unused capacity of the alternate area to the total capacity of the alternate area; and responsive to the execution condition, reassigning data to the alternate area during error recovery only if the execution condition has been met.

12. The method of claim 11, further comprising the step of sequentially executing a plurality of error recovery steps in response to the occurrence of an error during reading or writing, wherein each error recovery step is associated with a set of execution conditions.

13. The method of claim 12, further comprising the step of detecting an error occurring during reading or writing.

14. The method of claim 12, further comprising the steps of determining if a detected error has been corrected by one of the plurality of error recovery steps, identifying which of the plurality of error recovery steps corrected the error, and selectively causing the data reassign means to reassign data at successful completion of the identified step only if its associated set of execution conditions has been met.

15. The method of claim 12, wherein if one of the plurality of error recovery steps corrects the error, the step of reassigning data is only performed at completion of that error recovery step if the set of execution conditions associates with that step has been met.

16. The method of claim 11, wherein the unused capacity of the alternate area is determined using a reassign defect map comprising an original address and a destination address of reassigned data.

* * * * *